United States Patent
Bryant

[15] 3,638,181
[45] Jan. 25, 1972

[54] VEHICLE DECELERATION SIGNALING APPARATUS

[72] Inventor: Ensor Alexander Bryant, No. 4 Wimmera Avenue Manifold Heights, Geelong, Victoria, Australia

[22] Filed: Mar. 28, 1968
[21] Appl. No.: 721,552

Related U.S. Application Data

[63] Continuation-in-part of Ser. No. 706,909, Feb. 20, 1968, abandoned.

[30] Foreign Application Priority Data

Feb. 23, 1967 Australia .......................... 18159/67

[52] U.S. Cl. .................. 340/71, 200/61.47, 200/61.53, 340/66
[51] Int. Cl. ......................... B60q 1/50, H01h 35/14
[58] Field of Search .............. 340/66, 71; 200/61.47, 61.53, 200/61.89

[56] References Cited

UNITED STATES PATENTS

| | | | |
|---|---|---|---|
| 1,510,912 | 10/1924 | Allen | 340/71 |
| 1,695,712 | 12/1928 | Johnson | 340/67 |
| 2,800,545 | 7/1957 | Pellegrino | 340/71 X |
| 1,694,479 | 12/1928 | Milton | 200/61.47 |
| 1,858,191 | 5/1932 | Hadley et al. | 200/61.47 |
| 2,751,522 | 6/1956 | Spangenberg | 340/66 X |
| 2,832,863 | 4/1958 | Quimby | 340/71 UX |
| 3,057,976 | 10/1962 | Weaver | 200/61.53 X |
| 3,157,854 | 11/1964 | Riley | 340/71 |
| 3,217,121 | 11/1965 | Hradek et al. | 200/61.53 |
| 3,283,301 | 11/1966 | Beasley | 340/66 |
| 3,304,381 | 2/1967 | McAnespey | 340/71 UX |
| 3,359,540 | 12/1967 | Dunavan | 340/66 X |
| 3,395,388 | 7/1968 | Hendrickson | 340/71 |

FOREIGN PATENTS OR APPLICATIONS

| | | | |
|---|---|---|---|
| 482,951 | 4/1938 | Great Britain | 340/71 |

*Primary Examiner*—John W. Caldwell
*Assistant Examiner*—Kenneth N. Leimer
*Attorney*—Silverman & Cass

[57] ABSTRACT

Stoplight signaling equipment for a motor vehicle comprising a normally open inertia switch electrical contacts of which are connected in a circuit controlling illumination of a warning light and are closed by movement of an inertia element in the switch caused by inertia forces upon bodily acceleration of the switch. The switch is preferably mounted on throttle linkage of the vehicle to be moved bodily upon actuation of that linkage so that on sudden release of the throttle the switch is accelerated bodily to cause closure of contacts whereby light is illuminated even before vehicle brake is applied.

6 Claims, 17 Drawing Figures

INVENTOR
ENSOR ALEXANDER BRYANT

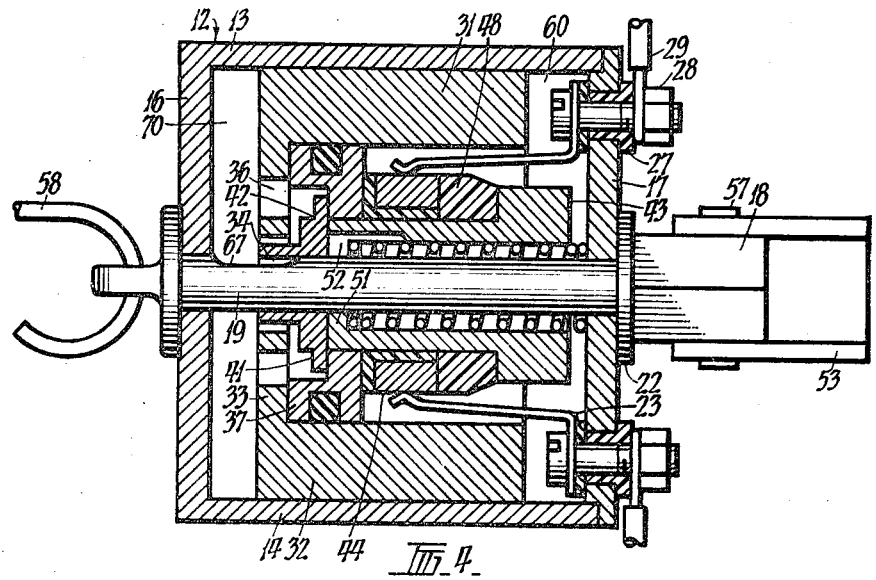
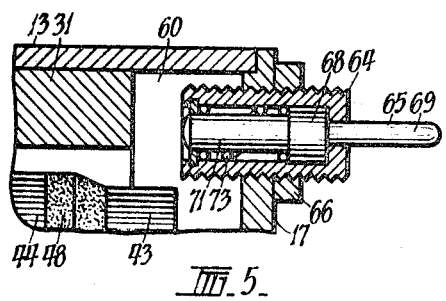
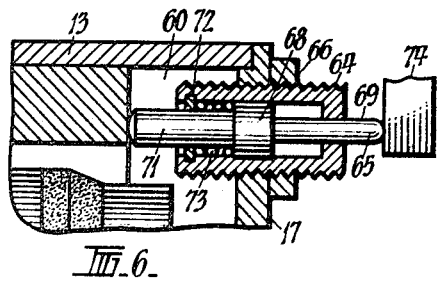
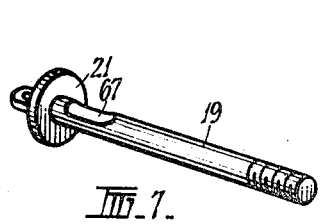
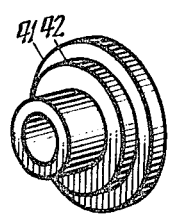
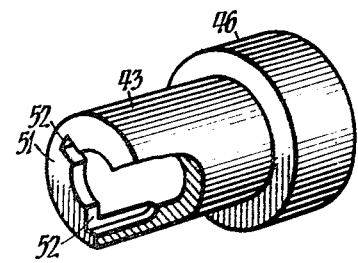
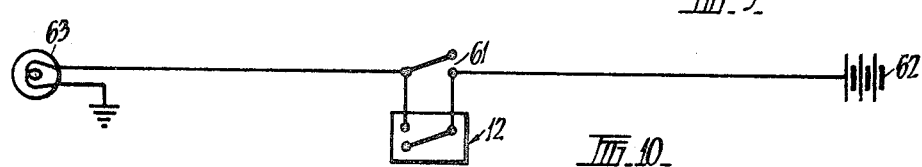
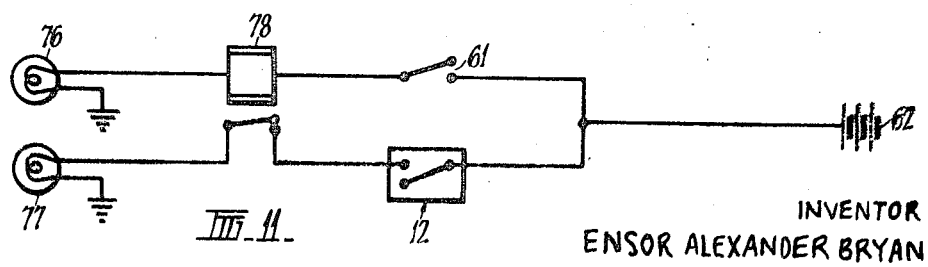
INVENTOR
ENSOR ALEXANDER BRYANT
BY Silverman & Cass
ATTYS.

INVENTOR
ENSOR ALEXANDER BRYANT
BY
Silverman & Cass
ATTYS.

3,638,181

1

VEHICLE DECELERATION SIGNALING APPARATUS

CROSS-REFERENCE TO RELATED APPLICATION

This application is a continuation-in-part of my copending U.S. application Ser. No. 706,909, filed Feb. 20, 1968, now abandoned.

BACKGROUND OF THE INVENTION

1. Field of the Invention

This invention relates to equipment for controlling rear warning lights on automobiles or other vehicles for the purpose of signaling to the drivers of following vehicles that the vehicle to which the equipment is fitted is about to reduce speed or stop. The invention is concerned particularly with switches for such equipment.

2. Description of the Prior Art

At the present time it is standard practice to fit motor vehicles with stoplights controlled by a switch operable by actuation of the vehicle brake pedal, or by a rise in pressure of the hydraulic brake system consequent upon movement of the brake pedal, so that they are illuminated when the driver begins to apply the brakes. However, stoplights which are controlled in this manner do not give an indication of the driver's intention to slow down or stop until he has actually moved the brake pedal. An earlier indication of the driver's intention is very desirable in order to give adequate warning to the drivers of following vehicles and thereby to reduce the danger of multiple collisions in situations which call for emergency stops.

It has previously been proposed to give early indications of the driver's intention to slow down or stop by means of stoplight devices operable upon release of the vehicle accelerator pedal. However, most such known devices give ambiguous indications, and in particularly they may continue to give a warning after the vehicle is stationary or when the vehicle is accelerating slowly after a period of deceleration. My prior Australian Pat. specification Nos. 253,323 and 48,896/64 disclose two forms of equipment each of which gives a more reliable indication of a driver's intention to decelerate. Each form of equipment includes a switch having a pair of contacts which are closed when the accelerator pedal is released and in each case the switch is designed so that it can be connected to the vehicle braking system to be actuated on operation of the brake in such a manner that ambiguous indications are avoided. The present invention involves the provision of switch which is actuated by inertia forces and can be installed in a vehicle so as to operate warning lights to provide a very early signal when the driver reacts suddenly in an emergency situation. Furthermore, the inertia-operated switch can be installed so as to eliminate the generation of spurious signals without any need for an operative connection to the braking system of the vehicle.

SUMMARY OF THE INVENTION

The present invention generally provides stoplight signaling equipment for a motor vehicle comprising an electric circuit controlling illumination of a warning light and a switch which comprises a body, an inertia element carried by the body and having a preferred condition with respect to the body but movable by acceleration of the body from that condition, electric contact means connected into said circuit and normally so conditioned that the warning light is not illuminated but conditionable by movement of the inertia element from its preferred condition to cause illumination of the warning light, said switch being mounted on the vehicle so that, upon rapid closure of the engine throttle, inertia forces cause movement of the inertia element from its preferred condition such as to condition said contact means to cause illumination of the warning light.

In one form of the invention, the switch may comprise a hollow body, an inertia element in the form of a piston slidable in the body and movable by acceleration of the body between first and second positions with respect to the body, electrical contact means actuable by movement of the inertia element

2 between said first and second positions and biasing means biasing the inertia element toward said first position relative to the body. In this case, movement of the inertia element from its second position to its first position may be damped by compression of air in a chamber defined between the piston and the body.

In an alternative form of the invention, the switch may comprise a body having an interior space, an inertia element in said space and electrical contact means fitted to the body. In operation of the switch the inertia element is gravity biased toward one location within said space but is movable by acceleration of the body away from said locations so as to alter the electrical condition of said contact means. In this case it is preferred that the inertia element is a quantity of mercury, said space is such as to define at said location a reservoir for the mercury, and the contact means comprises a pair of electrical contacts which are electrically insulated from one another when the quantity of mercury is within the reservoir but can be electrically bridged by mercury displaced from the reservoir by said acceleration of the switch body.

BRIEF DESCRIPTION OF THE DRAWINGS

In order that the invention may be more fully explained two specific embodiments thereof will now be described with reference to the accompanying drawings in which:

FIG. 4 is a further cross section corresponding to FIG. 2 but shows the switch as it is changing from a closed to an open condition;

FIG. 5 is a scrap cross section through a part of the switch which is fitted with a spring-loaded plunger;

FIG. 6 is a scrap cross section corresponding to FIG. 5 but shows the plunger being depressed against the action of its spring loading by engagement with a stop on the vehicle body;

FIG. 7 is a perspective view of a central shaft of the switch;

FIG. 8 is a perspective view of a check valve element incorporated in the switch;

FIG. 9 is a partly broken away perspective view of a carrier for a moving electrical contact incorporated in the switch;

FIG. 10 is a diagrammatic representation of one form of electrical circuit into which the switch can be connected to operate vehicle stoplights;

FIG. 11 is a diagrammatic representation of an alternative electrical circuit into which the switch can be connected to operate two sets of warning lights;

DESCRIPTION OF THE PREFERRED EMBODIMENT

Figure 1:
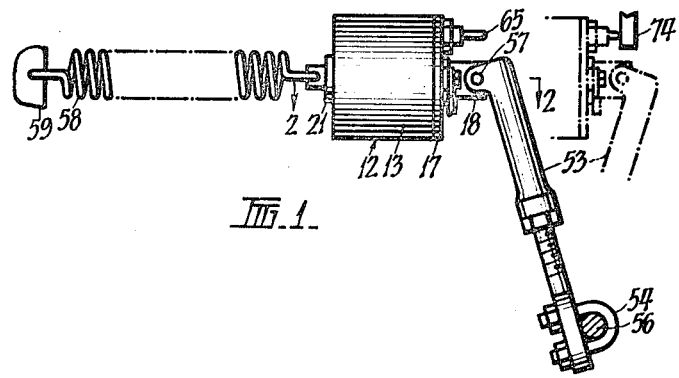
FIG. 1 shows one form of switch constructed and installed in a motor vehicle in accordance with the invention.

The switch of FIGS. 1 to 11 is denoted generally as 12 and comprises a cup-shaped housing 13 having a cylindrical peripheral wall 14 and an integral end disk 16. On assembly of the switch, the mouth of housing 13 is closed by an end disk 17. The latter disk is held in position by tightening of a clamping nut 18 along a screw thread which is formed on one end of a shaft 19 extending centrally through the housing and through holes in both end disks 16, 17. Shaft 19 has a flange 21 which on tightening of nut 18 bears against the outer face of end disk 16 and a washer 22 is disposed between clamping nut 18 and the outer face of end disk 17.

End disk 17 carries a pair of resilient blade contacts 23. These contacts are fastened to end disk 17 at diametrically opposite locations by a pair of screws 24 extending through appropriate apertures in the end disk and insulated from the end disk by electrically insulating washers 26 and grummets 27. The outer ends of screws 24 are fitted with clamping nuts 28 and electrical leads 29 can be clamped between nuts 28 and grummets 27 to connect blade contacts 23 into an electrical circuit as will be described hereinafter.

A heavy cup-shaped piston 31 is a close sliding fit within housing 13, this piston comprising a cylindrical portion 32 and an integral end disk portion 33. Disk portion 33 of piston 31 has a central aperture 34 through which shaft 19 extends and a pair of ports 36 pass through the disk portion 33 at diametrically opposite locations each just radially outwardly of the central aperture 34.

A generally cylindrical valve cage 37 is disposed within the cylindrical portion 32 of piston 31 and fits against the disk portion 33 of the piston. The outer periphery of the valve cage is grooved to receive a resilient O-ring seal 38 which is a tight fit within the cylindrical portion 32 of the piston. The inner periphery of the cage is stepped to define an annular valve face 39 which cooperates with a check valve element 41 as will be described hereinafter. Check valve element 41 is in the form of a flange sleeve which is a sliding fit on shaft 19 and projects with appreciable clearance through central aperture 34 in the end disk of piston 31. Its outer peripheral flange portion which traverses ports 36 is relieved at 42.

A tubular carrier 43 for an annular bridge contact 44 is inserted into the right-hand end of valve cage 37 with a tight fit so as to be located thereby. The right-hand end of carrier sleeve 43 is flanged at 46 and between the flange 46 and valve cage 37 the sleeve carries the bridge contact 44, an insulator 47, and a ring 48 of insulating material.

The assembly of the piston 31, valve cage 37, sleeve 43, bridge contact 44, insulator 47, and ring 48 is movable together with respect to housing 13 and is biased toward the left-hand end of the housing by a helical compression spring 49 disposed around shaft 19 and acting between the inner face of end disk 17 and an internal flange 51 on the left-hand end of contact carrier 43. The left-hand end of carrier 43 is also provided with three circumferentially spaced, axially extending, internal slots 52 which extend through the flange 51 and for some distance along the cylindrical portion of the carrier.

Figure 2:
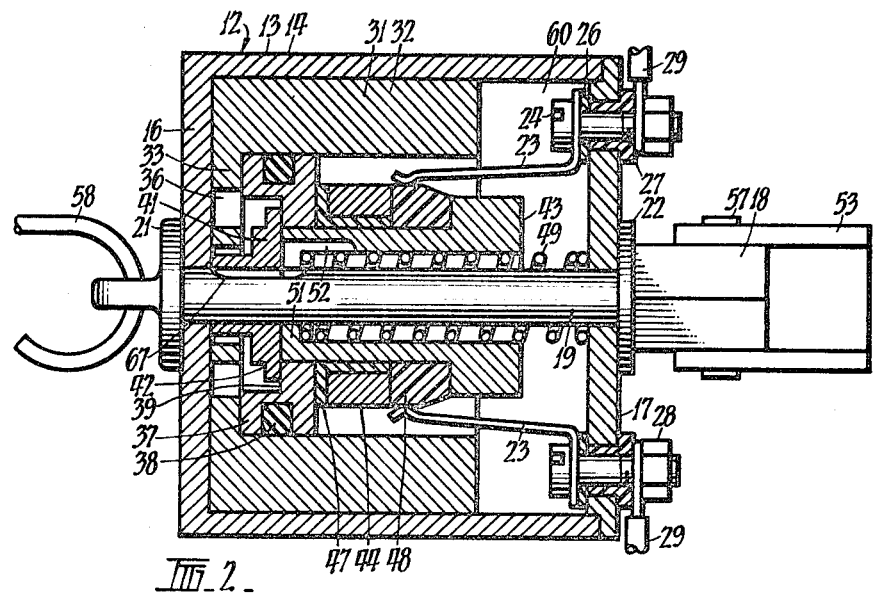
FIG. 2 is a cross section on the line 2—2 and shows the switch in an open condition.
Figure 3:
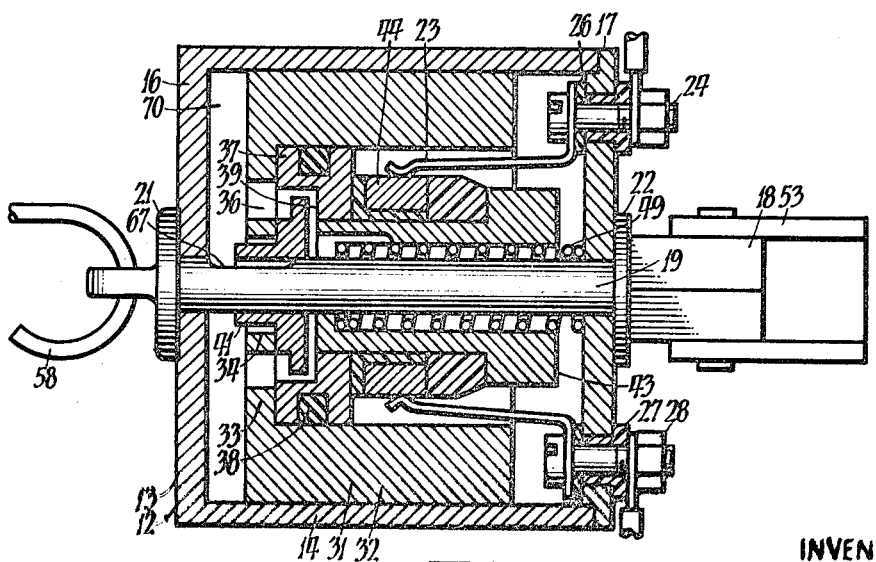
FIG. 3 is a cross section corresponding to FIG. 2 but shows the switch as it is changing from an open to a closed condition.
Figure 12:
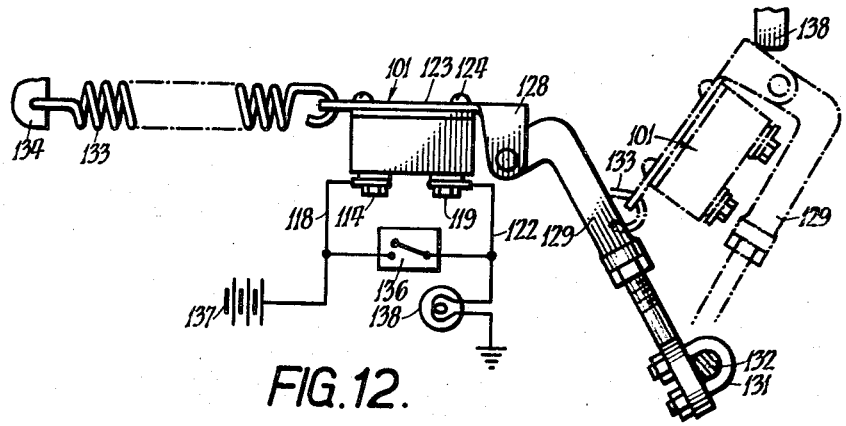
FIG. 12 shows an alternative form of switch constructed and installed in a motor vehicle in accordance with the invention.
Figure 13:
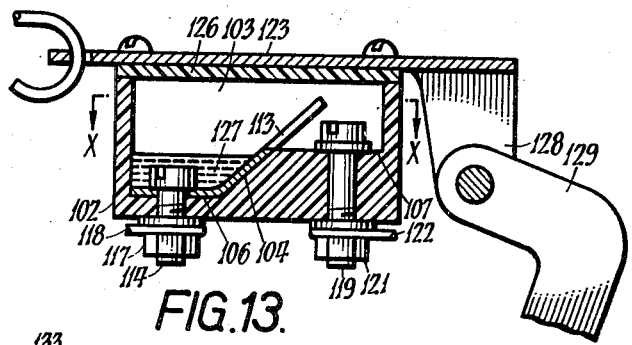
FIG. 13 is a view to an enlarged scale of part of the installation of FIG. 12, the switch being shown in section and in an open condition.
Figure 14:
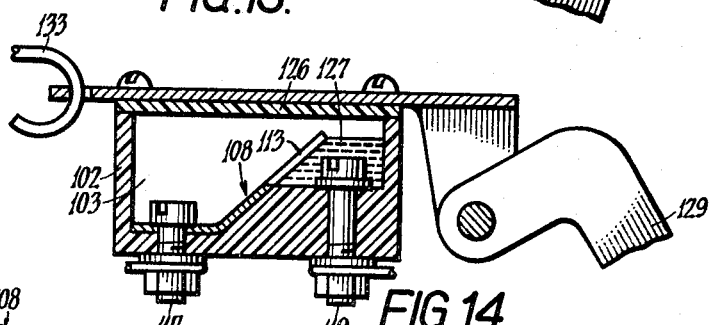
FIG. 14 is a view corresponding to FIG. 13 but shows the switch in a closed condition.
Figure 17:
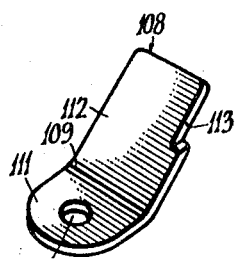
FIG. 17 is a perspective view of a metal ramp and contact plate incorporated in the switch.
Figure 16:
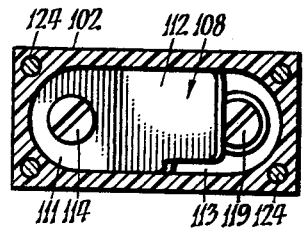
FIG. 16 is a section on the line X—X in FIG. 13.
Figure 15:
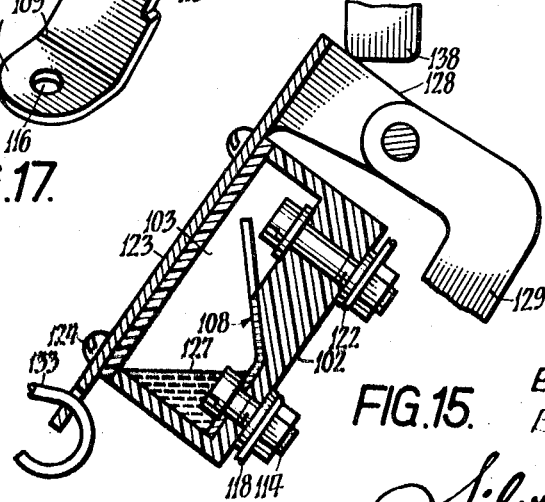
FIG. 15 is a view similar to FIGS. 13 and 14 but shows the switch being tilted by engagement with a stop when the throttle of the vehicle is approaching its fully open condition.

When the piston and contact assembly is held to the left as shown in FIG. 2, the ends of contact blades 23 engage ring 48 and are then insulated from one another so that the switch is in an open condition. However, movement of the piston and contact assembly to the right against the action of biasing spring 49 as shown in FIG. 3 causes the ends of blades 23 to ride onto bridge contact 44 which then bridges the two contact blades whereby the switch is closed.

FIG. 1 shows the manner in which the switch can be installed in a vehicle to control stoplights on the vehicle. The switch is mounted on the outer end of an arm 53 which is clamped at its inner end by means of a clamping shackle 54 to a rod 56 constituting part of the throttle linkage of the vehicle. Actuation of the accelerator pedal of the vehicle causes rotation of rod 56 and swinging movement of arm 53. The full lines in FIG. 1 show the position of the arm and switch when the throttle is fully closed and the dashed lines of the figure show the position of the arm and switch when the throttle is fully open. The switch is mounted on the end of arm 53 by means of a pin 57 driven through holes in the bifurcated outer end of arm 53 and an appropriate hole through clamping nut 18 of the switch. A helical tension spring 58 is connected between the left-hand end of switch shaft 19 and a fixture 59 on the vehicle body to serve as a return spring for the throttle linkage.

The switch 12 may simply be connected in parallel with a conventional hydraulic pressure actuated brake light switch in a vehicle brake light circuit. Such a circuit is illustrated in FIG. 10 where the switch is shown connected in parallel with a conventional brake actuated switch 61 in the brake light circuit between the vehicle battery 62 and a vehicle stoplight 63.

During normal relatively slow movements of the vehicle accelerator pedal, movement of arm 53 and switch 12 is quite smooth and the piston and contact assembly of the switch is held to the left with respect to the switch body by biasing spring 49. If, however, an emergency arises when the vehicle is traveling with its throttle fully or partially open and the accelerator is suddenly released, arm 53 is swung rapidly and the housing of switch 12 undergoes a substantial acceleration to the left. The inertia of the heavy piston 31 is such that the piston and contact assembly moves slower than the housing with the result that the piston and contact assembly is effectively shifted to the right with respect to the housing as shown in FIG. 3. Thus contact 44 bridges leaf contacts 23 and the switch is then closed to cause illumination of warning lights 63. The relative movement between the piston and contact assembly and the housing is stopped by engagement of the right-hand end of piston 31 with a hollow stop 64 which is externally screw-threaded and screwed into a tapped aperture in the end disk 17 as shown in FIGS. 1 and 5. Stop 64 can be adjusted to vary the amount of permitted relative movement between the piston and casing and is clamped in the required position by a clamping nut 66. A spring-loaded plunger 64 is fitted within hollow stop 64 for a purpose which will be explained hereinafter.

During the relative movement of piston 31 to the right with respect to the housing, air is forced from the chamber 60 to the right of the piston along the interior of tubular contact carrier 43 and via slots 52 in the left-hand end of that carrier to impinge on valve element 41. The valve element is forced to the left to permit the air to pass through ports 36 into the expanding chamber 70 to the left of piston 31, the relief of the valve element at 42 ensuring a free flow of air.

On termination of the rapid acceleration of the switch housing, spring 49 moves the piston assembly to the left. Valve element 41 moves into tight engagement with the seating surface 39 of valve cage 37 to prevent free flow of air from chamber 70. The air in chamber 70 is therefore compressed and leads slowly back into chamber 60 past the piston. Thus the return motion of the piston is damped and the piston moves slowly under the influence of spring 49. The switch is designed so that it takes several seconds for the piston to move sufficiently to move bridge contact 44 out of contact with leaf contacts 23 by which time the driver will have actuated the brake pedal and caused the conventional stoplight switch 61 to close.

It will be appreciated that the switch is closed immediately the accelerator is released suddenly to give a very early warning of the driver's intention. However, the switch returns to its open condition after a delay of only a few seconds and therefore cannot give spurious indications.

It will be seen from the figures that shaft 19 is relieved at 67 immediately adjacent end disk 16 of the housing 13 for a distance which is somewhat greater than the thickness of valve element 34. This relieved portion is of such a length that during return motion of the piston, it provides an air exhaust passage across valve disk 41 just before bridge contact comes out of engagement with leaf contacts 23. The damping of the return motion of the piston assembly is thus removed and the bridge contact moves quickly out of engagement with the leaf contacts to minimize sparking.

As mentioned above, stop 64 is hollow and is fitted with a spring-loaded plunger 65. Plunger 65, which is seen in FIGS. 1, 5, and 6, comprises a central portion 68 slidable within stop 64 and stem portions 69, 71 projecting one to either side of central portion 68. Stem portion 71 is slidable in a sealing ring 72 located in a groove in the inner periphery of stop 64 and a compression spring 73 acts between ring 72 and the central portion of the plunger 68 to bias the plunger to the right with its stem 69 projecting through an aperture in the right-hand end face of the stop. The purpose of plunger 65 is to prevent the switch from closing to cause spurious signals if for any reason the accelerator is rapidly depressed to its fully open position. When the accelerator approaches its fully open position, stem 69 the plunger engages a fixed abutment 74 on the vehicle body causing spring 73 to be compressed and stem 71 to extend from the left-hand end of stop 64 to engage piston 31 as shown in FIG. 6. This prevents relative movement between the piston and the housing. If the plunger were not provided, sudden arrest of movement of the switch to the right when the throttle reached its fully open condition could cause the piston assembly to "follow on" due to its inertia to close the switch and cause a spurious signal.

Switch 12 can also be used in conjunction with a conventional brake light switch to provide two types of warning signal, for example an amber light indicating an initial deceleration and a red light indicating actuation of brakes. A suitable circuit for this purpose is shown in FIG. 11. In this circuit the conventional brake light switch 61 is connected to a red brake light 76 and the inertia switch of the invention is connected in series with an amber warning light 77. A relay cutout 78 is provided to open the circuit to the amber light as soon as the brake actuated switch 61 is closed thereby to safeguard against the illumination of both lights at the same time.

Stop 64 can be adjusted axially to alter the permitted movement of the piston assembly and therefore the time for which the switch will remain closed after it is actuated. As shown in FIG. 1, arm 53 is formed in two pieces which fit together by screwing into one another so that the length of the arm can be adjusted. This is a convenient manner of altering the degree of movement of the switch as a whole and the inertia forces generated thereby.

It may be thought that when the switch is fitted to the throttle linkage of a vehicle equipped with a manually operated gearbox, it may cause unwanted signal flashes during gear changing. It has been found in practice that the movement of the throttle linkage during gear changing is quite even and does not cause the switch to close. In any event, the possibility of spurious signals from this cause can be eliminated by providing in the warning light circuit an overriding electrical switch operable by some part of the clutch mechanism, the overriding switch normally maintaining a closed circuit condition but operable to open the circuit on initial movement of the clutch pedal.

The switch of FIGS. 12 to 17 is denoted generally as 101 and comprises a body 102 of electrically insulating material which is hollowed out to form a bathlike cavity 103 the floor of which is stepped at 104 to form a lower floor portion 106 and upper floor portion 107. An electrically conducting metal strip 108, which is bent at 109 to form two planar portions 111, 112, is fitted to the floor of cavity 103 so that its portion 111 seats on the lower floor portion 106 and its portion 108 seats against the inclined step 104 and projects beyond that step above the upper floor portion 107. The part of strip portion 108 which projects above upper floor portion 112 of the body is provided with an edge notch 113.

A first electrical contact stud 14 extends downwardly through an aperture 116 in portion 111 of strip 108 and through the bottom of the body 102 to engage a clamping nut 117. An electrical lead 118 can be connected to stud 114 by tightening of nut 117 and the tightening of the nut also holds strip 108 in position. A second contact stud 119 is fitted through the bottom of body 102 so that its head projects into cavity 103 above upper floor portion 107. The lower end of this stud is fitted with a clamping nut 121 whereby an electrical lead 122 can be connected to it.

A cover plate 123 is fitted to the top of body 102 by means of fastening screws 124, a gasket 126 being sandwiched between this cover plate and the body to seal cavity 103 in a liquidtight manner, and the cavity is charged with a quantity of mercury 127. One end of cover plate 123 is provided with a pair of depending wings 128 provided with apertures which receive a pivot pin mounted on the outer end of an arm 129 which is clamped at its inner end by means of a clamping shackle 131 to a rod 132 constituting part of the throttle linkage of the vehicle. Actuation of the accelerator pedal of the vehicle causes rotation of rod 132 and swinging movement of arm 129. The full lines in FIG. 1 show the position of the arm and switch when the throttle is fully closed. Opening of the throttle causes swinging movement of arm 129 in a clockwise direction and therefore movement of switch 101 to the right. A helical tension spring 133 is connected between the left-hand end of the switch cover plate 123 and a fixture 134 on the vehicle to serve as a return spring for the throttle linkage.

Because of its stepped floor and the provision of metal strip 108, cavity 103 is effectively divided into upper and lower reservoirs. The lower reservoir is defined above the lower floor portion 106 and the body of mercury tends to drain into this reservoir at all times so that normally it is disposed in this reservoir as shown in FIG. 1. However portion 112 of strip 108 serves as a ramp, and upon rapid movement of the switch to the left the mercury will flow up this ramp and into the upper reservoir defined above the upper floor portion 107, the upper end of strip portion 112 serving as a retaining wall or weir for this reservoir. However the latter retaining wall is incomplete because of notch 113 and the mercury will drain through this notch and back down the ramp into the lower reservoir.

As shown in FIG. 1 switch 101 may be simply connected in parallel with a conventional hydraulic pressure actuated brake light switch 136 in the brake light circuit between the vehicle battery 137 and the vehicle stoplight 138.

During normal relatively slow movements of the vehicle accelerator pedal, movement of arm 129 is quite smooth and the body of mercury 127 remains in the lower reservoir. Contact studs 114, 119 are then insulated from one another and the switch is open. If, however, an emergency arises when the vehicle is driving with its throttle fully or partially open and the accelerator is suddenly released, arm 129 is swung rapidly and switch 102 undergoes a substantial acceleration to the left. The mercury then runs up the ramp portion 112 of strip 108 into the upper reservoir as shown in FIG. 3 and electrical contact is then established between studs 114 and 119 via strip 108 and the body of mercury. The switch is thus closed and warning light 138 is illuminated. Notch 113 is chosen so that several seconds elapse before the mercury drains completely from the upper reservoir into the lower reservoir so that the switch remains closed for some seconds by which time the normal brake switch 136 will have been actuated.

In order to prevent the mercury from running up the ramp into the upper reservoir if for any reason the accelerator is rapidly depressed to its fully open position, a stop 138 is provided on the vehicle body to engage the switch and tilt it as shown in FIG. 4 as the throttle approaches its fully open condition. This tilting of the switch increases the angle of the ramp and ensures that the mercury remains in the lower reservoir even though ramp 139 may be very rapidly decelerated when the throttle reaches its fully open position.

It will be appreciated that the switch of FIGS. 12 to 17 will give much the same performance as the one previously described with reference to FIGS. 1 to 11. However, both of these switches have been advanced merely by way of example and many modifications may be made thereto. For example, instead of providing ports for the passage of air through the piston of the first-described switch, an air entry port could be provided in the end disk 16 of the housing. This port could be fitted with a one-way valve to permit air to flow through it into chamber 70 but not to exhaust from the chamber.

In the second switch the contact means could be in the form of a pair of pins both projecting into the upper reservoir so as to be bridged by mercury displaced into that reservoir. Alternatively, the contact means could comprise a spring-loaded contact plate disposed across the floor of the upper cavity so as to be moved by the weight of liquid displaced into the upper reservoir. In this case the mercury could be replaced by a liquid which is not electrically conducting or by one or more solid rollable elements. In another variation, the inertia element of a switch constructed in accordance with the invention could be a member pivotally mounted on the switch body for swinging movement under the influence of inertia forces. In this case it could conveniently be biased by a torsion spring disposed about the pivot mounting.

Although the drawings show one manner of installing the switches in a vehicle, other manners are quite feasible. For example, in each the switch could alternatively be mounted directly on the accelerator pedal of the vehicle. It could be turned through 180° as compared with the position shown in the drawings so as to be operated when the throttle linkage reached the end of its return movement after release. This arrangement would, however, give slightly later signals than with the arrangement illustrated. An inertia switch according to the invention could alternatively be mounted directly on the vehicle body so as to be actuated by a sudden deceleration of the vehicle as a whole. It is to be understood that these and many other variations may be made without departing from the spirit and scope of the invention.

I claim:

1. Stoplight signaling apparatus in combination with a throttle linkage, a stop warning light and an electrical circuit controlling the illumination of said warning light, for a motor vehicle, said apparatus comprising: a switch having a switch body, an inertia element carried in the switch body and mounted therein to define a normal condition position with respect to said switch body, said inertia element and said switch body being intercoupled to enable relative movement of said inertia element to a warning condition position upon acceleration of said switch body, electrical contact means coupling said inertia element to said electrical circuit, said contact means being positioned relative to said inertia element in its normal condition position so that the warning light is not illuminated, said contact means operable by relative movement of said inertia element from its normal condition position to cause illumination of the warning light, connection means between said throttle linkage and said switch for bodily moving said switch with respect to the vehicle by actuation of the throttle linkage and means coupled to said switch body to prevent relative movement of the inertia element from its normal condition position with respect to the switch body when the throttle approaches its fully opened condition, whereby, on sudden closure of the throttle, inertia forces cause said relative movement of the inertia element.

2. The apparatus claimed in claim 1, wherein said switch is mounted on said throttle linkage.

3. The apparatus claimed in claim 2, wherein said throttle linkage comprises an elongate rod member mounted for rotation about its longitudinal axis upon actuation of the throttle linkage and the switch is mounted on an arm which extends transversely from said rod member and is rotatable therewith.

4. The apparatus claimed in claim 1 and further comprising means within said switch body to prolong the illumination of the warning light caused by the movement of the inertia element from its normal condition position.

5. The apparatus claimed in claim 4, wherein the means to prolong the illumination of the warning light comprises a pneumatic damper housed within said switch and arranged to maintain said electrical contact means operable by damping the movement of the inertia element back to its normal condition position, after it has been moved to initiate the illumination of the warning light.

6. The apparatus claimed in claim 1 wherein said last-named means comprises a plunger mounted on the switch body and a stop fixed to the vehicle body positioned to engage said plunger as the throttle approaches its fully opened condition, whereby the plunger is moved with respect to the switch body to engage the inertia element.

* * * * *